US012022254B2

(12) United States Patent
Ye

(10) Patent No.: US 12,022,254 B2
(45) Date of Patent: Jun. 25, 2024

(54) SOUND APPARATUS FOR GENERATING IMPROVED SOUND AND DISPLAY APPARATUS INCLUDING THE SAME

(71) Applicant: LG DISPLAY CO., LTD., Seoul (KR)

(72) Inventor: Jaehun Ye, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 81 days.

(21) Appl. No.: 17/510,627

(22) Filed: Oct. 26, 2021

(65) Prior Publication Data

US 2022/0132236 A1 Apr. 28, 2022

(30) Foreign Application Priority Data

Oct. 28, 2020 (JP) ................................ 2020-180266

(51) Int. Cl.

*H04R 1/26* (2006.01)
*H04R 1/02* (2006.01)
*H04R 7/04* (2006.01)
*H04R 17/00* (2006.01)

(52) U.S. Cl.

CPC ............... *H04R 1/26* (2013.01); *H04R 1/028* (2013.01); *H04R 7/04* (2013.01); *H04R 17/00* (2013.01); *H04R 2499/15* (2013.01)

(58) Field of Classification Search

CPC . H04R 1/26; H04R 1/028; H04R 7/04; H04R 17/00; H04R 2499/15; H04R 17/005

See application file for complete search history.

(56) References Cited

U.S. PATENT DOCUMENTS 6,747,395 B1 * 6/2004 Satoh .................. H04R 17/005 310/327
10,542,235 B2 1/2020 Shin et al.
10,820,082 B2 10/2020 Lee
10,972,819 B2 4/2021 Kim et al.
2019/0149908 A1 5/2019 Kim et al.
2020/0098970 A1 * 3/2020 Corona .................. H10N 30/50
2020/0184939 A1 6/2020 Lee et al.

FOREIGN PATENT DOCUMENTS

EP 1100288 A2 * 5/2001 ............ H04R 7/045
JP 2002-524946 A 8/2002
JP 2007-104712 A 4/2007
JP 2019-130462 A 8/2019
JP 2020-141276 A 9/2020
KR 2017-0113637 A 10/2017

(Continued)

OTHER PUBLICATIONS

Wikipedia, Liquid-crystal display, published Sep. 2019 (http:/web.archive.org/web/20190909072130/https://en.wikipedia.org/wiki/Liquid-crystal_display) (Year: 2019).*

(Continued)

*Primary Examiner* — Mark Fischer
(74) *Attorney, Agent, or Firm* — POLSINELLI PC

(57) ABSTRACT

A sound apparatus comprises a plurality of vibration devices and a vibration member including a same main surface connected to the plurality of vibration devices, the plurality of vibration devices include a first vibration device and a second vibration device, which transfer vibrations having different phases each other to the vibration member.

17 Claims, 14 Drawing Sheets

(56) References Cited

FOREIGN PATENT DOCUMENTS

| | | | | | |
|---|---|---|---|---|---|
| KR | 2018-0077582 | A | | 7/2018 | |
| KR | 2018-0124442 | A | | 11/2018 | |
| KR | 2019-0009188 | A | | 1/2019 | |
| KR | 2019-0040712 | A | | 4/2019 | |
| KR | 2019-0052949 | A | | 5/2019 | |
| KR | 20190051122 | A | * | 5/2019 | ............. G02F 1/133 |
| KR | 2019-0070749 | A | | 6/2019 | |
| KR | 2019-0080416 | A | | 7/2019 | |
| KR | 2020-0021392 | A | | 2/2020 | |
| KR | 2020-0068341 | A | | 6/2020 | |
| WO | 2010/053032 | A1 | | 5/2010 | |
| WO | 2011/105046 | A1 | | 9/2011 | |
| WO | 2018/216711 | A1 | | 11/2018 | |

OTHER PUBLICATIONS

English machine translation of KR1020190051122 (Lim et al., Display Apparatus, published May 2019) (Year: 2019).*
Korean Office Action dated Jul. 25, 2023 issued in Patent Application No. 10-2021-0145461 (9 pages).
Japanese Office Action dated Mar. 7, 2024 issued in Patent Application No. 2020-180266 (5 pages).
Chinese Office Action, dated Mar. 28, 2024 issued in Patent Application No. 202111262112.0 (10 pages).

* cited by examiner

SOUND APPARATUS FOR GENERATING IMPROVED SOUND AND DISPLAY APPARATUS INCLUDING THE SAME

CROSS-REFERENCE TO RELATED APPLICATION

This application claims the priority of Japanese Patent Application No. 2020-180266 filed on Oct. 28, 2020, which is hereby incorporated by reference in its entirety.

BACKGROUND

Field of the Disclosure

The present disclosure relates to a sound apparatus and a display apparatus including the same.

Description of the Background

Korean Patent Publication No. 10-2018-0077582 discloses a display apparatus including a display panel and an actuator. The display apparatus in Korean Patent Publication No. 10-2018-0077582 has a function of controlling the actuator to vibrate the display panel.

The structure described in Korean Patent Publication No. 10-2018-0077582 may be applied to a sound apparatus. However, the sound quality of a sound apparatus based on the structure of Korean Patent Publication No. 10-2018-0077582 may be insufficient.

SUMMARY

Accordingly, the present disclosure is directed to providing a sound apparatus that substantially obviates one or more problems due to limitations and disadvantages of the related art.

More specifically, the present disclosure is to provide a sound apparatus with enhanced sound quality.

Additional advantages and features of the disclosure will be set forth in part in the description which follows and in part will become apparent to those having ordinary skill in the art upon examination of the following or may be learned from practice of the disclosure. The features and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a sound apparatus comprising a plurality of vibration devices, and a vibration member including a same main surface connected to the plurality of vibration devices, wherein the plurality of vibration devices comprise a first vibration device and a second vibration device, and wherein the first vibration device and the second vibration device transfer vibrations having different phases each other to the vibration member.

In another aspect of the present disclosure, there is provided a sound apparatus comprising a display panel including an image display surface configured to display an image and a main surface opposite to the image display surface, and a vibration apparatus configured to vibrate the display panel, wherein the display panel is a vibration member, and wherein the vibration apparatus comprises the sound apparatus, the sound apparatus comprises a plurality of vibration devices, and a vibration member including a same main surface connected to the plurality of vibration devices, wherein the plurality of vibration devices comprise a first vibration device and a second vibration device, and wherein the first vibration device and the second vibration device transfer vibrations having different phases each other to the vibration member.

According to aspects of the present disclosure, a sound apparatus with enhanced sound quality may be provided.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of the present disclosure, illustrate aspects of the disclosure and together with the description serve to explain the principle of the disclosure.

In the drawings.

DETAILED DESCRIPTION

Figure 1:
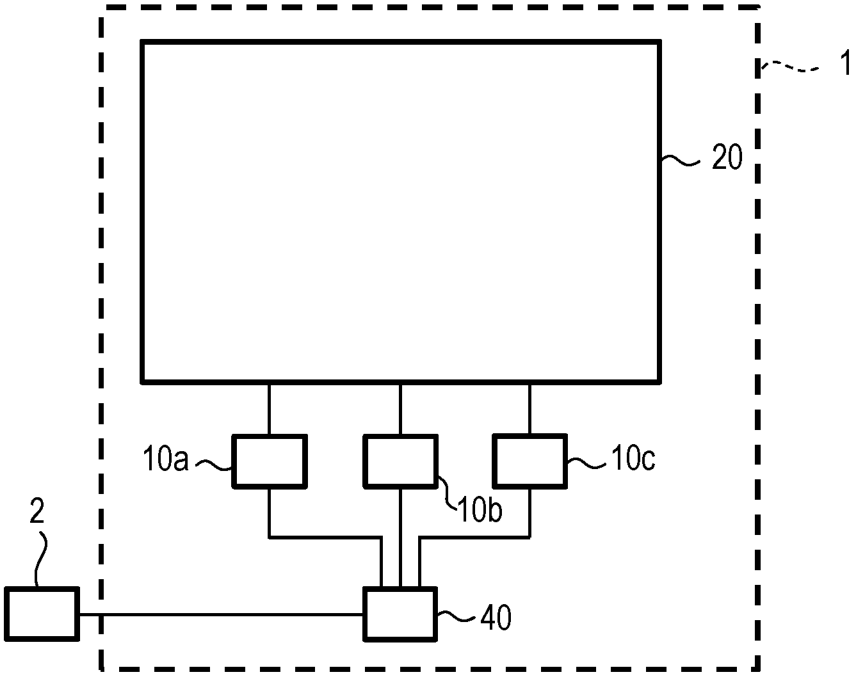
FIG. 1 is a schematic block diagram of a sound apparatus according to a first aspect of the present disclosure.

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing aspects of the present disclosure are merely an example, and thus, the aspects of present disclosure are not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In the description of aspects, when a structure is described as being positioned "on or above" or "under or below" another structure, this description should be construed as including a case in which the structures contact each other as well as a case in which a third structure is disposed therebetween.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Hereinafter, aspects of the present disclosure will be described in detail with reference to the accompanying drawings. In the drawings, like reference numerals refer to like elements having a common function, and repeated descriptions are omitted or will be briefly given. For convenience of description, a scale of each of elements illustrated in the accompanying drawings differs from a real scale, and thus, is not limited to a scale illustrated in the drawings.

[First Aspect]

FIG. 1 is a schematic block diagram of a sound apparatus according to a first aspect of the present disclosure. A sound apparatus 1 according to an aspect of the present disclosure may be individually applied as a speaker or embedded into another apparatus. For example, the sound apparatus 1 may be embedded into a signage such as an advertising signboard, a poster, and a noticeboard. In this case, a voice such as guidance may be generated from a signage. Also, the sound apparatus 1 may be embedded into display apparatus, a computer, and a television, or the like. However, the use of the sound apparatus 1 according to an aspect of the present disclosure is not limited thereto.

As illustrated in FIG. 1, the sound apparatus 1 may include a plurality of piezoelectric devices 10*a* to 10*c*, a vibration member 20, and a controller 40. The sound apparatus 1 may be an apparatus which generates a sound based on a sound signal (or a vibration driving signal) input thereto.

The piezoelectric devices 10*a* to 10*c* may each be an element which is displaced based on an inverse piezoelectric effect when a voltage based on an input voice signal is applied thereto. Each of the piezoelectric devices 10*a* to 10*c* may be, for example, an element, which is flexurally displaced based on a voltage, such as bimorph or unimorph or the like. The input voice signal may be a commonly alternating current (AC) voltage, and thus, the piezoelectric devices 10*a* to 10*c* may function as a vibration device which vibrates based on the input voice signal.

The vibration member 20 may be a member which vibrates to generate a sound based on a common voice signal input to the piezoelectric devices 10*a* to 10*c*. Each of the piezoelectric devices 10*a* to 10*c* may be mechanically connected (or coupled) to the vibration member 20 through an elastic member. A material of the vibration member 20 is not limited to a specific material. However, the material of the vibration member 20 may include one or more of glass, resin, hard paper, compression paper, plastic, cloth, fiber, leather, metal, and wood suitable for transferring a vibration transferred from each of the piezoelectric devices 10*a* to 10*c*, but aspects of the present disclosure are not limited thereto.

A host system 2 may be a system including an apparatus or a plurality of apparatuses, which supply the voice signal to control the sound apparatus 1. However, the host system 2 may further supply other signals such as an image signal (for example, RGB data) and a timing signal (for example, a vertical synchronization signal, a horizontal synchronization signal, and a data enable signal, etc.) or the like based on the use purpose of the sound apparatus 1. The host system 2 may be, for example, a source sound reproduction apparatus, a local broadcast apparatus, a radio broadcast reproduction system, a television (TV) system, a set-top box, a navigation system, an optical disk player, a computer, a home theater system, a video phone system, or the like. Also, the sound apparatus 1 and the host system 2 may be an integrated apparatus or separate apparatuses.

The controller 40 may supply the piezoelectric devices 10*a* to 10*c* with a voltage based on the common voice signal. The controller 40 may be configured as a plurality of semiconductor integrated circuits (ICs). For example, the controller 40 may include an amplification circuit such as a pre-amplifier and/or a power amplifier, or the like.

Figure 2:
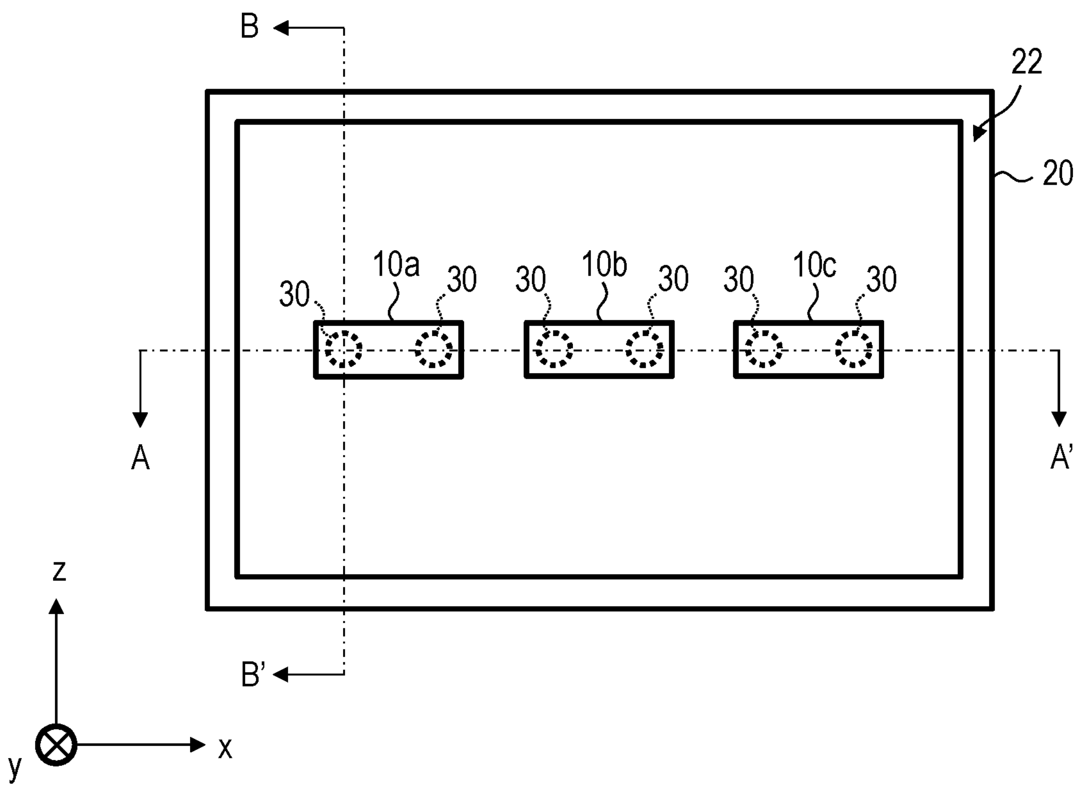
FIG. 2 is a plan view illustrating the arrangement of piezoelectric devices according to a first aspect of the present disclosure.
Figure 3:
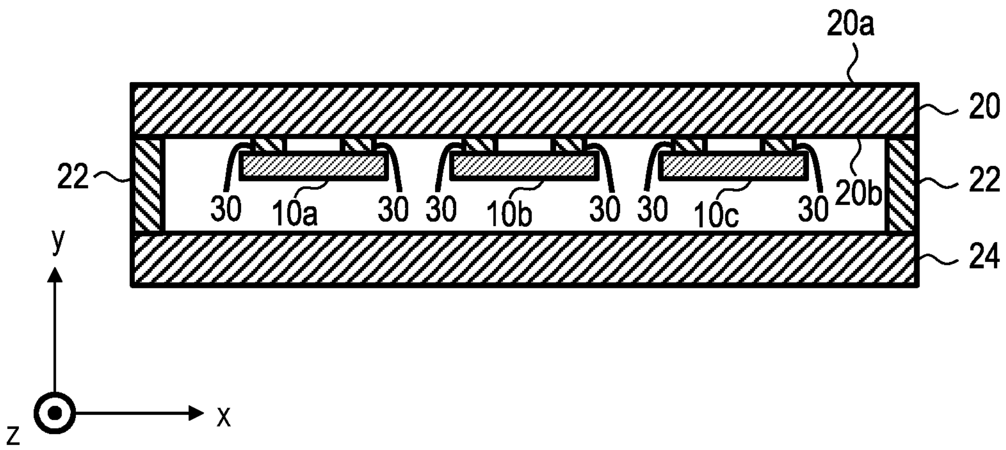
FIG. 3 is a cross-sectional view illustrating the arrangement of piezoelectric devices according to a first aspect of the present disclosure.
Figure 4:
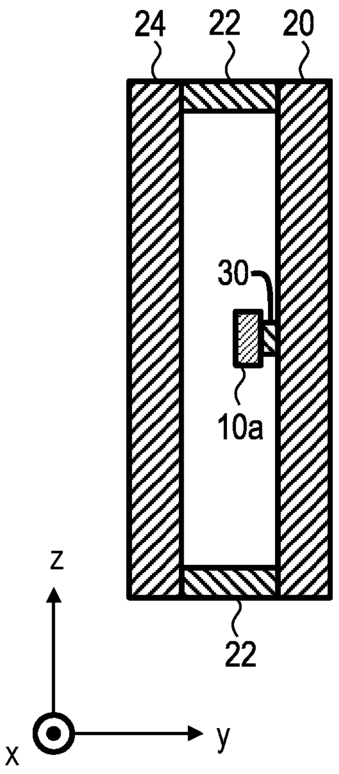
FIG. 4 is a cross-sectional view illustrating the arrangement of piezoelectric devices according to a first aspect of the present disclosure.

FIG. 2 is a plan view illustrating the arrangement of piezoelectric devices 10*a* to 10*c* according to the first aspect of the present disclosure. FIGS. 3 and 4 are cross-sectional views illustrating the arrangement of the piezoelectric devices 10*a* to 10*c* according to the first aspect of the present disclosure. The arrangement of the piezoelectric devices 10*a* to 10*c* will be described below with reference to FIGS. 2 to 4. In FIG. 2, a tetragonal border (or boundary) of a vibration member 20 schematically illustrates an external appearance of the vibration member 20. As illustrated in FIG. 2, the vibration member 20 may have a plate shape, and when seen in a direction (or an upward direction) vertical to a main surface (or when seen in a plane in the direction vertical to the main surface), the vibration member 20 may have a rectangular shape, but aspects of the present disclosure are not limited thereto and may have a non-tetragonal shape.

As illustrated in FIG. 3, the vibration member 20 may comprise a first surface 20*a* and a second surface 20*b*. For example, the first surface 20*a* of the vibration member 20 may be a surface corresponding to a surface sound source, and may be a main surface, a front surface, or an upper surface. The second surface 20*b* of the vibration member 20 may be a surface which faces or is opposite to the first surface 20*a*, and may be a secondary surface, a rear surface, a backside surface, or a lower surface. For example, FIG. 2 is a perspective plan view when the vibration member 20 is seen from the second surface 20*b*. In the X-Y-Z coordinates illustrated in FIG. 2, the X axis represents a horizontal direction (or a first direction) of the first surface 20*a*, the Z axis represents a vertical direction (or a second direction) of the first surface 20*a*, and a y axis represents a depth direction (or a third direction) of the first surface 20*a*. Also, a direction from the second surface 20*b* to the first surface 20*a* may be defined as a forward direction of the Y axis. FIG. 3 is a cross-sectional view taken along line A-A' of FIG. 2, and FIG. 4 is a cross-sectional view taken along line B-B' of FIG. 2.

As illustrated in FIGS. 2 to 4, when seen in a plane, an outer periphery (or an outer perimeter) of the second surface 20*b* of the vibration member 20 may be connected to a first surface (or one surface) of a frame 22 having a rectangular frame shape. A second surface, which is opposite to the first surface, of the frame 22 connected to the vibration member 20 may be connected to a back cover 24. For example, the back cover 24 may be connected to a surface, which is opposite to a side connected to the vibration member 20, of the frame 22. The vibration member 20 and the back cover 24 may be opposite to each other with a void (or a gap space) therebetween. Accordingly, the vibration member 20, the frame 22, and the back cover 24 may implement a case or a body case of the sound apparatus 1. The piezoelectric devices 10*a* to 10*c* may be disposed in or accommodated into the case. According to an aspect of the present disclosure, the frame 22 may be a middle frame, a connection member, an intermediate member, a sidewall member, a supporting member, or a first supporting member. And, the back cover 24 may be a back frame, a back plate, a rear cover, a rear frame, a rear plate, a rear structure, a rear member, a cover member, a supporting member, or a second supporting member.

The back cover 24 may shield or seal an inner space of the case so that a sound generated from a vibration of the piezoelectric devices 10*a* to 10*c* is not leaked to the outside in a rearward direction of the case. Also, the back cover 24 may function to protect the piezoelectric devices 10*a* to 10*c* so that the piezoelectric devices 10*a* to 10*c* do not contact an external object. For example, the vibration member 20, the back cover 24, and the frame 22 may be connected to one another by a compression resin material, an adhesive, or an adhesive tape, or the like. For example, the frame 22 may include material such as metal or resin, or the like. For example, the back cover 24 may include a material such as metal, resin, glass, hard paper, compression paper, plastic, cloth, fiber, leather, or wood, or the like. However, materials of the frame 22 and the back cover 24 are not limited to a specific material.

The vibration member 20 may perform a function of a signage, in addition to a function of outputting a sound. For example, contents such as a sentence (or a letter), a picture, and/or a sign, etc. of the signage may be arranged to be visible from the first surface 20*a* of the vibration member 20.

For example, the first surface 20*a* of the vibration member 20 may have a function of an arrangement surface for the contents. The contents may be directly attached at the first surface 20*a* of the vibration member 20, and a medium such as paper or the like at which the contents are attached through printing or the like may be attached at the first surface 20*a* of the vibration member 20. Also, the contents may be attached at a position (or a portion) in addition to the first surface 20*a* of the vibration member 20. For example, the contents may be arranged at an outer surface of the back cover 24 (or a surface opposite to a surface facing the vibration member 20), and thus, the outer surface of the back cover 24 may have a function of the arrangement surface for the contents. Also, the contents may be attached at all of the first surface 20*a* of the vibration member 20 and the outer surface of the back cover 24, and thus, all of the first surface 20*a* of the vibration member 20 and the outer surface of the back cover 24 may be the arrangement surface for the contents and a visible signage which is visible at both sides (or in both directions) may be implemented.

Each of the piezoelectric devices 10*a* to 10*c* may have a plate shape. As illustrated in FIG. 2, when seen in a plane, each of the piezoelectric devices 10*a* to 10*c* may have a rectangular shape which has a long-side direction (an x-axis direction of the drawing) (or a first direction) and a short-side direction (a z-axis direction of the drawing) (or a second direction). Therefore, when seen in a cross-sectional surface (line A-A') along the long-side direction x, the piezoelectric devices 10*a* to 10*c* may be displaced to be bent when a voltage is applied thereto. The long-side direction of each of the piezoelectric devices 10*a* to 10*c* may be disposed to be vertical to an end portion of the vibration member 20.

Each of the piezoelectric devices 10*a* to 10*c* may be connected to the second surface 20*b* of the vibration member 20 by two elastic members 30. For example, each of the piezoelectric devices 10*a* to 10*c* may be connected to the same main surface of the vibration member 20 through the elastic member 30. For example, the elastic member 30 may be a connection member, or a coupling member, or the like.

The elastic member 30 may include a member configured by a material having elasticity. The elastic member 30 may be configured to include a material having a modulus which is less than each of the piezoelectric devices 10*a* to 10*c* and the vibration member 20. For example, the elastic member 30 may be formed of a material such as rubber or the like. Both end portions (or both ends or both periphery portions) of each of the piezoelectric devices 10*a* to 10*c* in a long-side direction may be connected to a portion of the vibration member 20 by the elastic member 30. For example, the elastic member 30 may be spaced apart from the both ends (or an outer surface) of each of the piezoelectric devices 10*a* to 10*c* in the long-side direction by a certain distance, for a smooth vibration of each of the piezoelectric devices 10*a* to 10*c*. For example, with respect to the long-side direction of the piezoelectric devices 10*a* to 10*c*, the elastic member 30 may be disposed to be close to the both ends of each of the piezoelectric devices 10*a* to 10*c*, between a center portion and the both ends of each of the piezoelectric devices 10*a* to 10*c*. Therefore, a vibration of each of the piezoelectric devices 10*a* to 10*c* may be transferred to the vibration member 20, and the vibration member 20 may generate a sound based on a voice signal input thereto. The both ends of each of the piezoelectric devices 10*a* to 10*c* in the long-side direction may be a portion which is an antinode of a flexural vibration. For example, a portion which is an antinode of a flexural vibration may be a portion at which an amplitude of a vibration is the maximum. Accordingly, the elastic member 30 may be connected to (or to be close or adjacent to) a portion near the both ends of each of the piezoelectric devices 10*a* to 10*c* in the long-side direction, and thus, a vibration of each of the piezoelectric devices 10*a* to 10*c* may be efficiently transferred to the vibration member 20.

Figure 5:
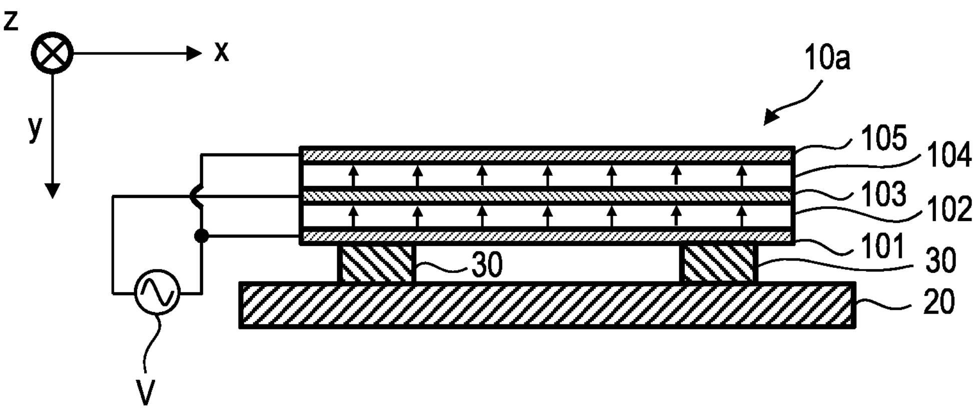
FIG. 5 is a cross-sectional view illustrating in more detail a structure of a piezoelectric device according to a first aspect of the present disclosure.

FIG. 5 is a cross-sectional view illustrating in more detail a structure of a piezoelectric device (or a first piezoelectric device) 10*a* according to a first aspect of the present disclosure. FIG. 5 illustrates a cross-sectional view taken along line A-A' of FIG. 2 like FIG. 3 although a direction differs from FIG. 3. Also, FIG. 5 illustrates an enlarged portion near the piezoelectric device 10*a*, but other piezoelectric devices 10*b* and 10*c* may also have the same structure as the piezoelectric device 10*a*. Also, FIG. 5 schematically illustrates, by a circuit diagram, a connection relationship between electrodes included in the piezoelectric device 10*a*, for describing a method of inputting a voice signal to the piezoelectric device 10*a*.

The piezoelectric device 10*a* illustrated in FIG. 5 may include a bimorph structure where two piezoelectric layers are stacked. The piezoelectric device 10*a* may include a plurality of electrodes 101, 103, and 105 and a plurality of piezoelectric layers 102 and 104. The electrode 101 disposed closest to the vibration member 20 may be connected to the elastic member 30. The electrode 101 and the electrode 103 may be disposed to face the piezoelectric layer 102 in a thickness direction. Arrows illustrated inside the piezoelectric layers 102 and 104 represent polarization directions of the piezoelectric layers 102 and 104. For example, the polarization direction of the piezoelectric layer (or a first piezoelectric layer) 102 may be the same as the piezoelectric layer (or a second piezoelectric layer) 104. Also, a line configured to apply a voltage to each electrode may be connected to the electrodes 101, 103, and 105 by soldering, or the like, but in FIG. 5, the illustration of the line is omitted.

A voltage applied to the piezoelectric device 10*a* may be based on a voice signal, and thus, may be an AC voltage corresponding to a frequency of a voice (or a sound) which is to be generated. In FIG. 5, the AC voltage is represented by "V" which is a circuit sign for an AC power. In the AC power V, one terminal (or a first terminal) may be connected to the electrodes 101 and 105, and the other terminal (or a second terminal) may be connected to the electrode 103. For example, a voltage having the same phase (or in-phase) may be applied to the electrode 101 and the electrode 105, voltages having opposite phases (or anti-phases) may be applied to the electrode 101 and the electrode 103, and voltages having opposite phases may be applied to the electrode 103 and the electrode 105. Accordingly, a reverse-direction voltage may be applied to the piezoelectric layer 102 and the piezoelectric layer 104.

Materials of the piezoelectric layers 102 and 104 are not limited and may include a material, having good piezoelectric properties, such as lead zirconate tinanate (PZT) because the amount of displacement is capable of increasing. Also, in a configuration of FIG. 5, an outer periphery (or an outer perimeter) of the piezoelectric device 10 may be covered by an insulator such as resin or the like so as to prevent an electrical short circuit between the piezoelectric device 10 and another member.

Figure 6:
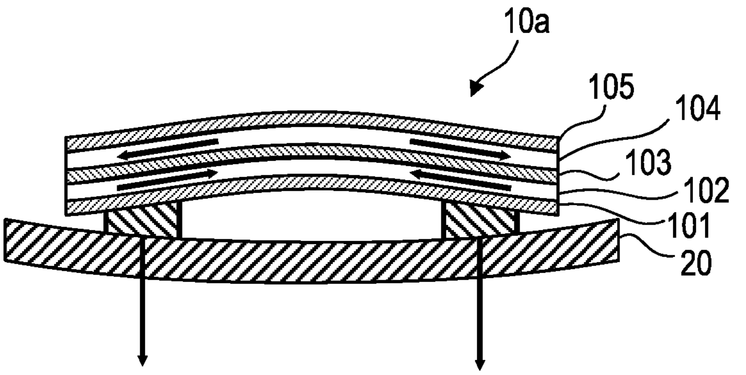
FIG. 6 is a schematic diagram illustrating deformation of a piezoelectric device when a voltage is applied to the piezoelectric device according to a first aspect of the present disclosure.
Figure 7:
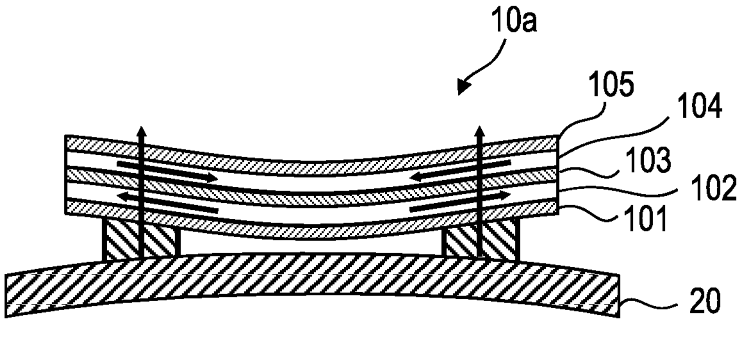
FIG. 7 is a schematic diagram illustrating deformation of a piezoelectric device when a voltage is applied to the piezoelectric device according to a first aspect of the present disclosure.

FIGS. 6 and 7 are schematic diagrams illustrating deformation of a piezoelectric device when a voltage is applied to the piezoelectric device according to a first aspect of the present disclosure. As illustrated in FIG. 5, polarization directions of the piezoelectric layers 102 and 104 may be the same directions, and voltages applied to the piezoelectric layers 102 and 104 may be applied in opposite directions (or reversed directions). Accordingly, a stretching direction (or an expansion and contraction direction) of the piezoelectric layer 102 and the piezoelectric layer 104 may be opposite or inverted (or reversed) to each other.

As illustrated in FIG. 6, at a timing at which the piezoelectric layer 102 is deformed to contract in the horizontal direction (or a widthwise direction), the piezoelectric layer 104 may be deformed in a direction in which the piezoelectric layer 104 expands in the horizontal direction. Therefore, an end portion of the piezoelectric device 10*a* may be bent in a direction closer to the vibration member 20. Therefore, the vibration member 20 may be deformed based on a stress applied in a direction spaced apart from or away from the piezoelectric device 10*a*.

As illustrated in FIG. 7, at a timing at which the piezoelectric layer 102 is deformed to expand in the horizontal direction, the piezoelectric layer 104 may be deformed in a direction in which the piezoelectric layer 104 contracts in the horizontal direction. Therefore, the end portion of the piezoelectric device 10*a* may be bent in a direction spaced apart from or away from the vibration member 20. At this time, the vibration member 20 may be deformed based on a stress applied in a direction toward the piezoelectric device 10*a*.

When an AC voltage based on a voice signal is applied to the piezoelectric device 10*a*, a deformation state of FIG. 6 and a deformation state of FIG. 7 may be alternately repeated in a frequency of a voice (or a sound). Therefore, a vibration of the piezoelectric device 10*a* may be transferred to the vibration member 20, and thus, the vibration member 20 may vibrate. Accordingly, a voice (or a sound) may be generated based on the voice signal in the vibration member 20, and thus, the vibration member 20 may be implemented as a driving unit (or a driver or a vibrator) of a speaker. Also, various frequency sounds of an audible band may overlap in a real voice (or sound), and thus, an aspect (or a shape) of a real vibration may be more complicated than the illustrating of the drawing.

In an aspect of the present disclosure, some of the plurality of piezoelectric devices 10*a* to 10*c* may be configured to vibrate based on a phase which differs from the other piezoelectric device. For example, a configuration where the piezoelectric device 10*b* (or a second piezoelectric device) vibrates based on an opposite phase of a phase of each of the piezoelectric device 10*a* (or a first piezoelectric device) and the piezoelectric device 10*c* (or a third piezoelectric device) will be described below with reference to FIG. 8.

Figure 8:
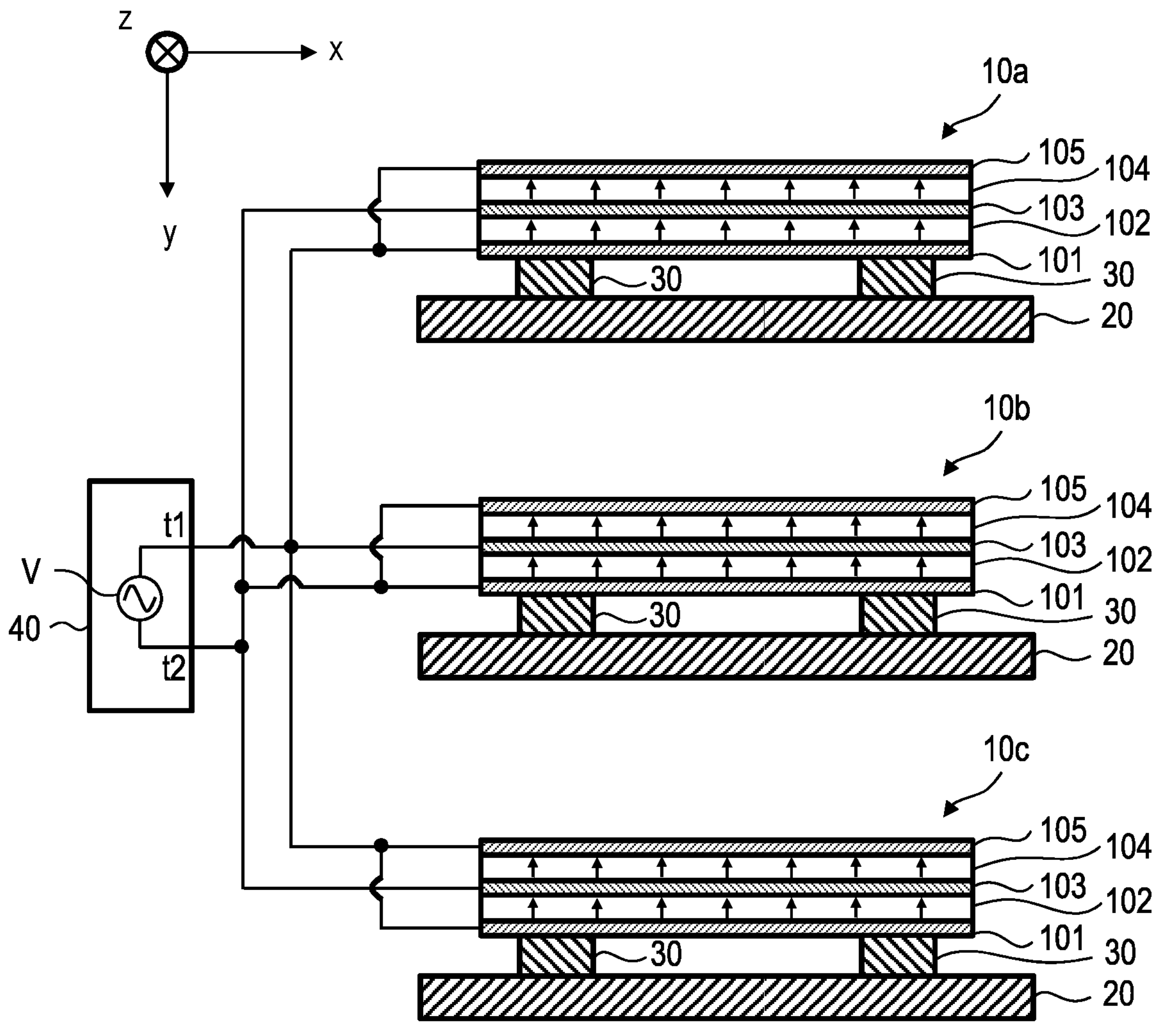
FIG. 8 is a schematic diagram illustrating in more detail a method of inputting a voice signal on each of piezoelectric devices according to a first aspect of the present disclosure.

FIG. 8 is a schematic diagram illustrating in more detail a method of inputting a voice signal on each of piezoelectric devices 10*a* to 10*c* according to a first aspect of the present disclosure. A controller 40 may output an AC voltage based on a voice signal to a terminal t1 (or a first terminal) and a terminal t2 (or a second terminal) of a signal source V. Output voltages of the terminal t1 and the terminal t2 may have opposite phases to each other. The terminal t1 may be connected to electrodes 101 and 105 (or first electrodes) of the piezoelectric device 10*a*, an electrode 103 (or a second electrode) of the piezoelectric device 10*b*, and electrodes 101 and 105 of the piezoelectric device 10*c*. The terminal t2 may be connected to an electrode 103 (or a second electrode) of the piezoelectric device 10*a*, electrodes 101 and 105 (or first electrodes) of the piezoelectric device 10*b*, and an electrode 103 of the piezoelectric device 10*c*.

Based on such a connection relationship, a phase of a voltage applied between electrodes of the piezoelectric device 10*a* and a phase of a voltage applied between electrodes of the piezoelectric device 10*b* may be opposite phases to each other. Also, a phase of a voltage applied between the electrodes of the piezoelectric device 10*a* and a phase of a voltage applied between electrodes of the piezoelectric device 10*c* may be the same phase to each other. For example, when the piezoelectric devices 10*a* and 10*c* are displaced in a state of FIG. 6, the piezoelectric device 10*b* may be displaced in a state of FIG. 7, and when the piezoelectric devices 10*a* and 10*c* are displaced in a state of FIG. 7, the piezoelectric device 10*b* may be displaced in a state of FIG. 6. Therefore, the piezoelectric devices 10*a* and 10*c* and the piezoelectric device 10*b* may transfer vibrations having opposite phases to a vibration member 20.

Figure 9:
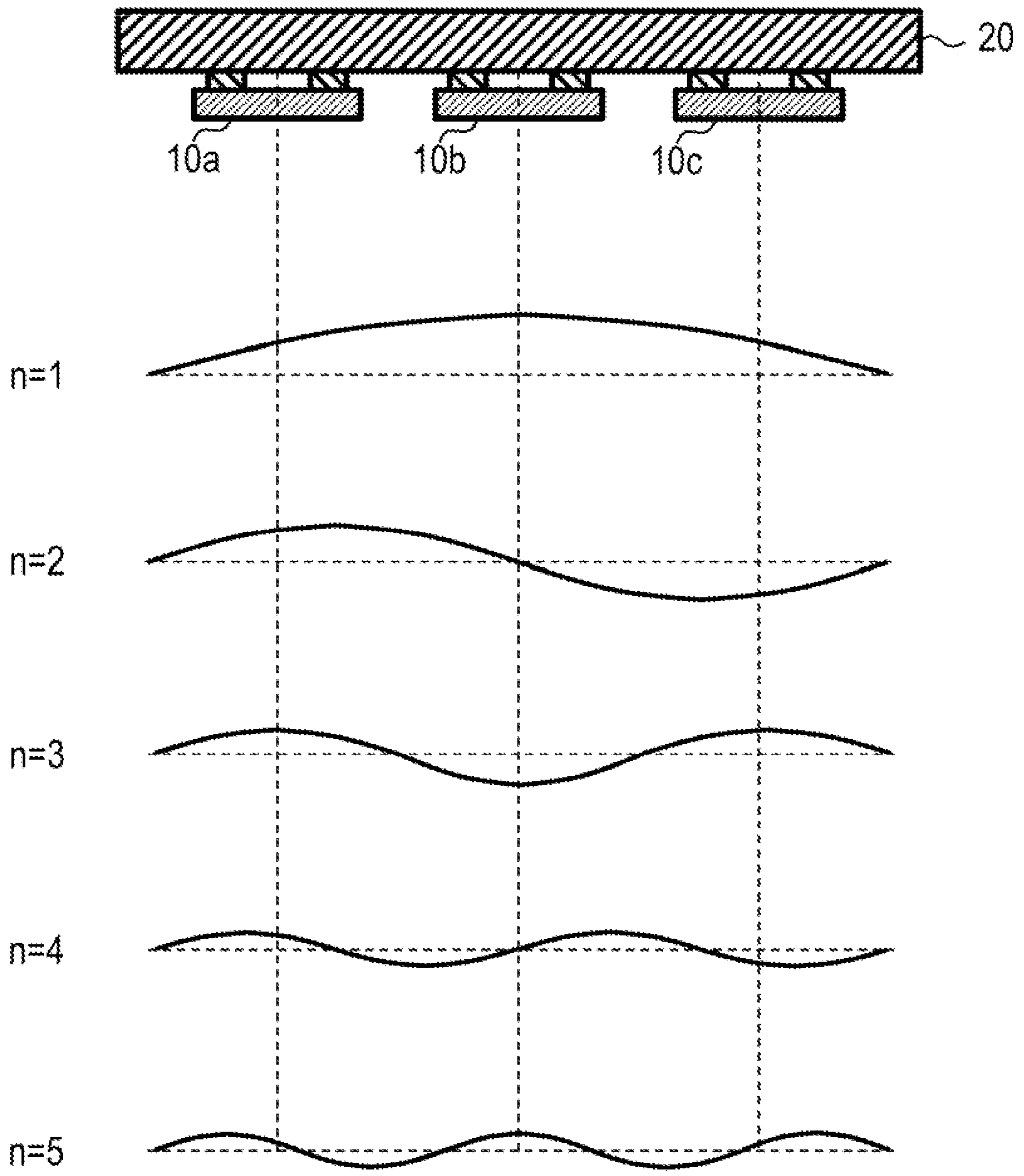
FIG. 9 is a schematic diagram describing an effect obtained by the sound apparatus according to a first aspect of the present disclosure.

As described above, an effect obtained by vibrating the piezoelectric devices 10*a* and 10*c* and the piezoelectric device 10*b* based on opposite phases will be described with reference to FIGS. 9 and 10. FIG. 9 is a schematic diagram describing an effect obtained by the sound apparatus 1 according to the first aspect of the present disclosure. In a speaker which generates a voice (or a sound) by vibrating a vibration plate, a vibration state of the vibration plate based on a natural vibration frequency and a frequency of the vibration plate may largely affect a frequency characteristic of a sound pressure level. For example, when a divisional vibration having a vibration shape where the vibration plate is finely waved is generated based on a high-order natural vibration mode (or a higher-mode vibration or higher-mode natural vibration) or the like, a sound pressure level may be reduced, and sound-quality degradation such as the occurrence of peak or dip may occur in a frequency characteristic.

In a vibration member 20 having a rectangular plate shape according to an aspect of the present disclosure, a natural vibration mode where vertical resonance and horizontal resonance are two-dimensionally combined may be generated, and thus, it may be required to review a two-dimensional (2D) model or a three-dimensional (3D) model in detail. However, in order to simplify a model, the 2D model will be described below. FIG. 9 illustrates five natural vibration modes having first-order ($n=1$) to fifth-order ($n=5$) vibration shapes in a model based on only a first-order mode in a long-side direction (or an x direction or a first direction) of the vibration member 20. A natural frequency of each of the natural vibration modes may increase as an order increases. Also, as illustrated in FIGS. 2 to 4, the natural vibration modes may be based on a boundary condition where an end portion of the vibration member 20 is supported by a frame 22.

As illustrated in FIG. 9, positions of a node and an antinode of a vibration may be changed based on an order of a natural vibration mode, and simultaneously, the position dependency of a phase of a displacement may be changed. For example, in a first-order natural vibration mode, signs of phases may be the same in all of the vibration member 20, but in a second-order natural vibration mode, signs of phases may be opposite with respect to a center of the vibration member 20.

As illustrated in FIG. 9, in a third-order natural vibration mode, signs of phases may be the same near both ends of the vibration member 20, and signs of phases near the center of the vibration member 20 may be opposite to signs of phases near the both ends of the vibration member 20. Such a phase relationship, as described above with reference to FIG. 8, may match a phase relationship where phases of vibrations of the piezoelectric devices 10*a* and 10*c* are opposite to a phase of a vibration of the piezoelectric device 10*b*. Also, as illustrated in FIG. 9, a position of each of the piezoelectric devices 10*a* to 10*c* may correspond to a position of an antinode of a third-order natural vibration mode. Accordingly, a phase relationship between piezoelectric devices according to an aspect of the present disclosure may be easy to strongly excite the third-order natural vibration mode compared to the other natural vibration modes. In the second-order and fourth or more-order natural vibration modes, a phase relationship may not match the piezoelectric devices 10*a* and 10*c*, and due to this, excitation may be difficult.

As in an aspect of the present disclosure, some of a plurality of piezoelectric devices may vibrate based on opposite phases, and thus, a relatively low-order natural vibration mode may be easily excited and the excitation of a relatively high-order natural vibration mode may be difficultly controlled. Therefore, due to a high-order natural vibration mode, it may be difficult to generate a divisional vibration where a vibration plate is finely waved. Accordingly, according to an aspect of the present disclosure, a degradation in sound quality caused by a divisional vibration of the vibration plate may be reduced or minimized.

Figure 10:
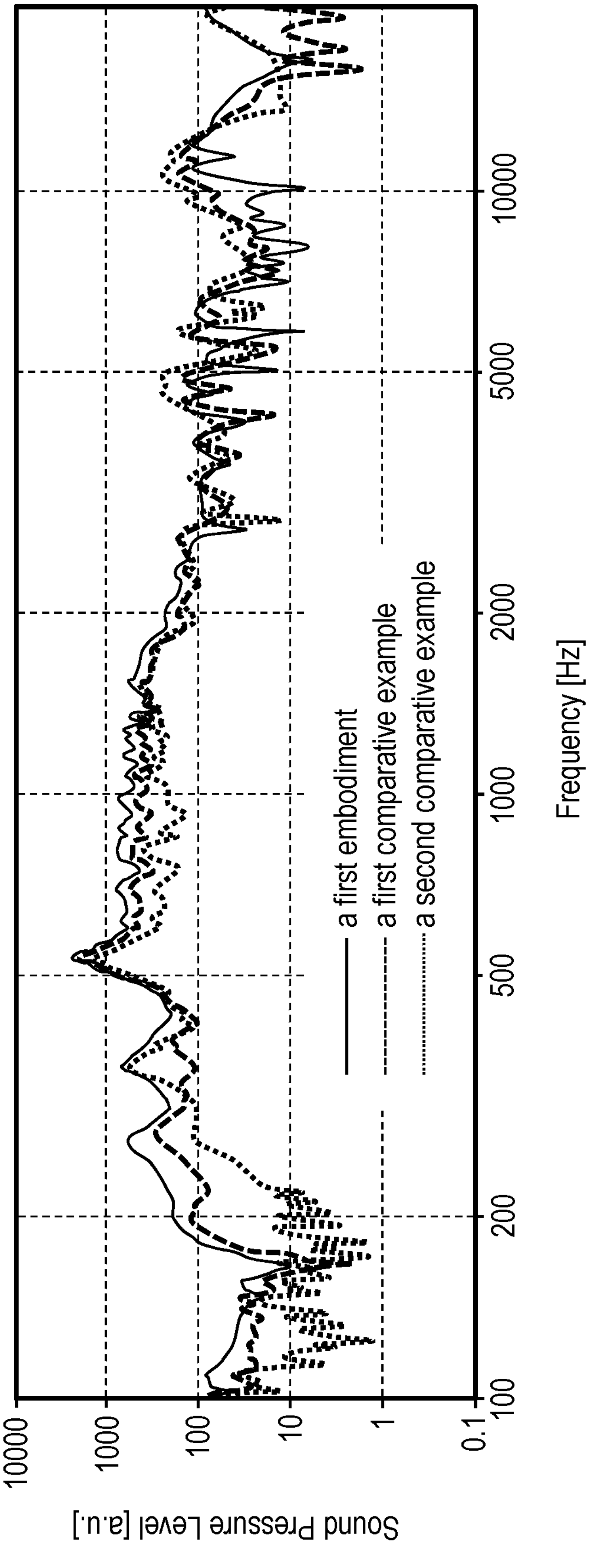
FIG. 10 is a schematic diagram describing an effect obtained by the sound apparatus according to a first aspect of the present disclosure.

FIG. 10 is a graph for describing an effect obtained by the sound apparatus 1 according to the first aspect of the present disclosure. FIG. 10 illustrates frequency characteristics of sound pressure levels of two comparative examples (a first comparative example and a second comparative example) and a configuration of an aspect of the present disclosure. In a vertical axis (or the ordinate axis) of FIG. 10, an arbitrary unit (a.u.) represents an amplitude generated in the sound apparatus 1 when a certain voltage is applied to the sound apparatus 1. A horizontal axis (or the abscissa axis) of FIG. 10 represents a frequency of a voltage applied to a piezoelectric device. For example, a unit of a frequency is Hz. Also, FIG. 10 is a log-log graph.

The first comparative example is an example where, as a voltage is applied to the piezoelectric device 10*b*, only the piezoelectric devices 10*a* and 10*c* vibrate based on the same phase and the piezoelectric device 10*b* does not vibrate. The second comparative example is an example where voltages having the same phase are applied to three piezoelectric devices so that all of the piezoelectric devices 10*a* to 10*c* vibrate based on the same phase.

In FIG. 10, comparing a characteristic of the first aspect of the present disclosure with a characteristic of the first comparative example, it may be seen that a sound pressure level increases considerably in a low-pitched sound band of about 100 Hz to about 500 Hz and a middle-pitched sound band of about 600 Hz to about 1,500 Hz, in a characteristic of the first aspect of the present disclosure. Accordingly, by adding the piezoelectric device 10*b* vibrating based on an opposite phase, it may be seen that an effect of enhancing a sound pressure level is obtained.

Moreover, comparing a characteristic of the first aspect of the present disclosure with a characteristic of the second comparative example, it may be seen that a characteristic of the first aspect of the present disclosure has a higher sound pressure level in the low-pitched sound band and the middle-pitched sound band. Accordingly, it may be seen that a case where a phase of the piezoelectric device 10*b* is opposite to that of each of the piezoelectric devices 10*a* and 10*c* is better than a case where a phase of the piezoelectric device 10*b* is the same as each of the piezoelectric devices 10*a* and 10*c*. As described above, according to the graph of FIG. 10, the sound apparatus 1 according to the first aspect of the present disclosure may include the piezoelectric device 10*b* which vibrates based on an opposite phase of a phase of each of the piezoelectric devices 10*a* and 10*c*, and thus, it may be seen that a sound pressure level is enhanced in a band from the low-pitched sound band to the middle-pitched sound band. Accordingly, according to the first aspect of the present disclosure, the sound apparatus 1 may be provided where a sound pressure level frequency characteristic in an audible frequency is flat and sound quality is enhanced.

Moreover, comparing with the first comparative example, it may be seen that a sound pressure level from the low-pitched sound band to the middle-pitched sound band in the second comparative example is lower than the first comparative example. That is, when the piezoelectric device 10*b* vibrating based on the same phase as each of the piezoelectric devices 10*a* and 10*c* is added, the number of piezoelectric devices operating increases, but a sound pressure level is reduced. Comparing a graph of the first comparative example with a graph of the second comparative example, it may be seen that sound quality is not enhanced or is degraded in a method where the piezoelectric device 10*b* having the same phase is provided and the number of piezoelectric devices increases, without considering a phase relationship. Also, comparing the graph of the first comparative example with the graph of the second comparative example, it may be seen that an operation of controlling a natural vibration mode by appropriately adjusting a phase relationship between the piezoelectric device 10*b* and the piezoelectric devices 10*a* and 10*c* is a significant factor for contributing the enhancement of a sound pressure level. In an aspect of the present disclosure, based on such a research result, a phase relationship between the piezoelectric devices 10*a* to 10*c* may be adjusted, and thus, the sound quality of the sound apparatus 1 may be enhanced.

[Second Aspect]

In a second aspect of the present disclosure, a modification example of the sound apparatus 1 according to the first aspect of the present disclosure will be described. Repeated descriptions of elements common to the first aspect of the present disclosure are omitted or will be briefly given below.

Figure 11:
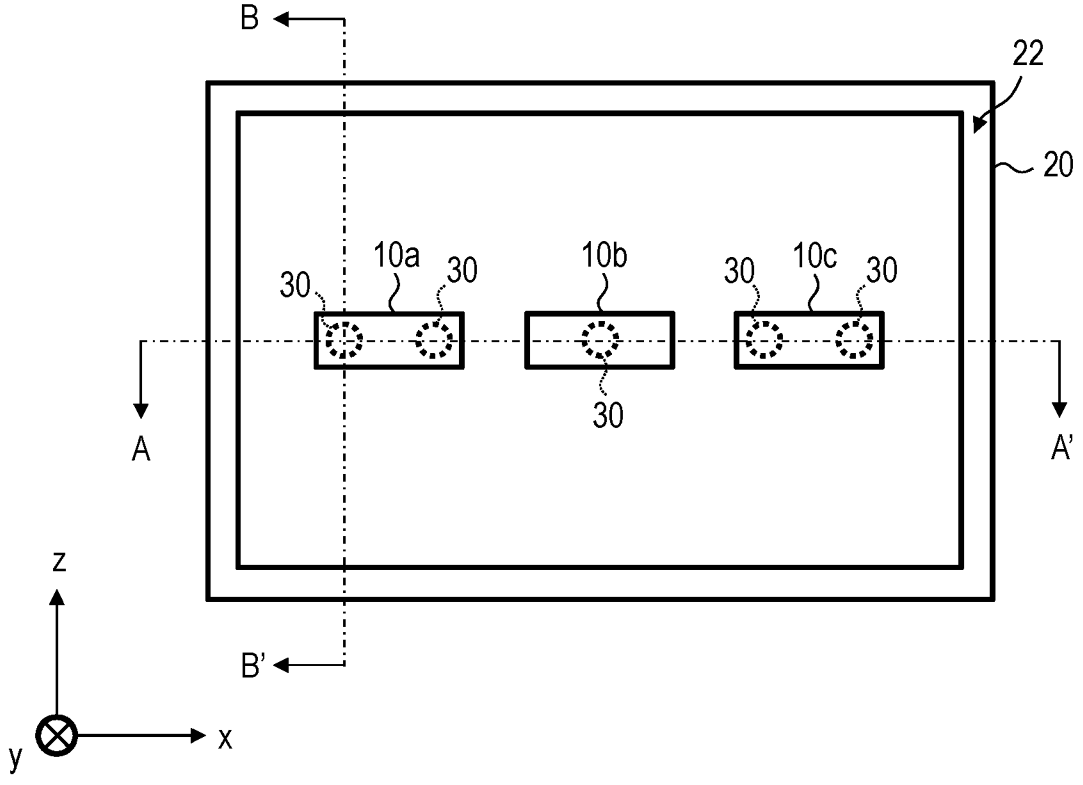
FIG. 11 is a plan view illustrating the arrangement of piezoelectric devices according to a second aspect of the present disclosure.
Figure 12:
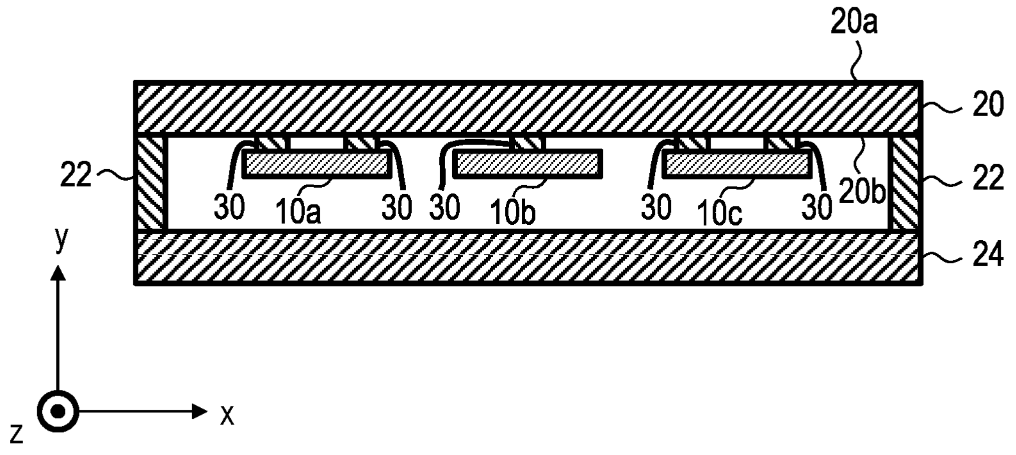
FIG. 12 is a cross-sectional view illustrating the arrangement of the piezoelectric devices according to a second aspect of the present disclosure.

FIG. 11 is a plan view illustrating the arrangement of piezoelectric devices 10*a* to 10*c* according to a second aspect of the present disclosure. FIG. 12 is a cross-sectional view illustrating the arrangement of the piezoelectric devices 10*a* to 10*c* according to a second aspect of the present disclosure. The arrangement of the piezoelectric devices 10*a* to 10*c* will be described below with reference to FIGS. 11 and 12. FIG. 12 is a cross-sectional view taken along line A-A' of FIG. 11. A cross-sectional view taken along line B-B' of FIG. 11 is the same as FIG. 4, and thus, illustration and descriptions are omitted.

As illustrated in FIGS. 11 and 12, each of the piezoelectric device 10*a* and the piezoelectric device 10*c* may be connected to a vibration member 20 by an elastic member 30 at both end portions (or a first connection part) of a piezoelectric device in a long-side direction by the same structure as the first aspect of the present disclosure. On the other hand, the piezoelectric device 10*b* may be connected to the vibration member 20 by the elastic member 30 at a near-center portion (or a second connection part) of the piezoelectric device 10*b*, and such a connection structure of the piezoelectric device 10*b* may be a difference between the second aspect of the present disclosure and the first aspect of the present disclosure. The near-center portion of the piezoelectric device 10*b* may be a portion which is an antinode of a flexural vibration. Accordingly, as the elastic member 30 is connected to the near-center portion of the piezoelectric device 10*b*, a vibration of the piezoelectric device 10*b* may be efficiently transferred to the vibration member 20.

Figure 13:
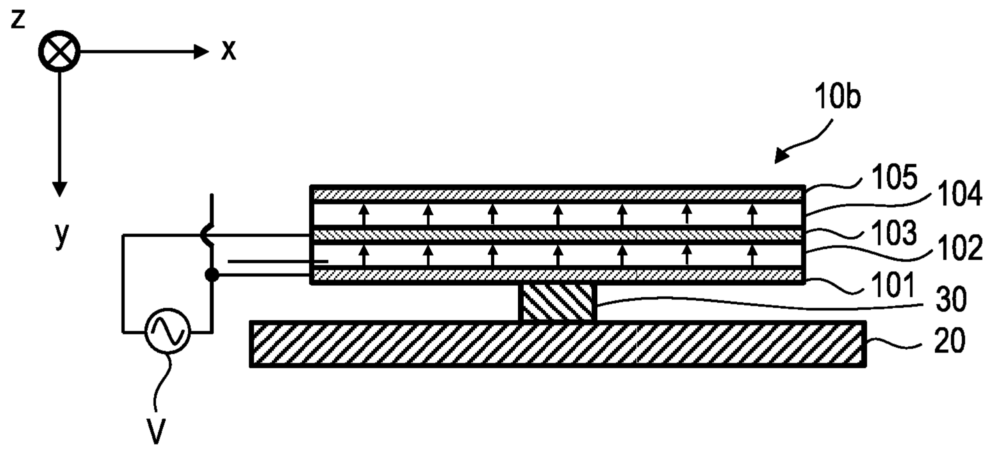
FIG. 13 is a cross-sectional view illustrating in more detail a structure of a piezoelectric device according to a second aspect of the present disclosure.

FIG. 13 is a cross-sectional view illustrating in more detail a structure of a piezoelectric device 10*b* according to a second aspect of the present disclosure. FIG. 13 illustrates a cross-sectional view taken along line A-A' of FIG. 11 like FIG. 12 although a direction differs from FIG. 12. Also, FIG. 13 illustrates an enlarged portion near the piezoelectric device 10*b*. Also, other piezoelectric devices 10*a* and 10*c* may also have the same structure as FIG. 5 according to a first aspect of the present disclosure. Also, FIG. 13 is a schematic diagram illustrating by a circuit diagram a connection relationship of each electrodes included in the piezoelectric device 10*b* for describing a method of inputting a sound signal to the piezoelectric device 10*b*. In FIG. 13, in addition to the arrangement of the elastic member 30 connecting the piezoelectric device 10*b* to the connection member 20, a structure and a voltage applying direction may be the same as the illustration of FIG. 5, and thus, their repetitive descriptions are omitted.

Figure 14:
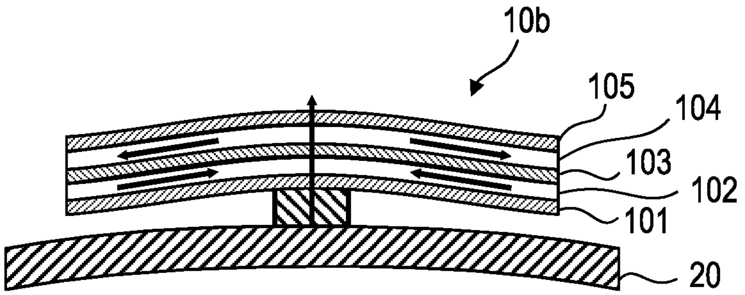
FIG. 14 is a schematic diagram illustrating deformation of a piezoelectric device when a voltage is applied to the piezoelectric device according to a second aspect of the present disclosure.
Figure 15:
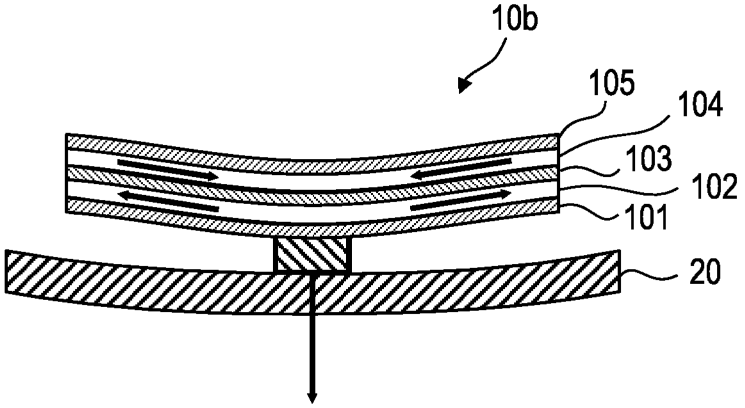
FIG. 15 is a schematic diagram illustrating deformation of a piezoelectric device when a voltage is applied to the piezoelectric device according to a second aspect of the present disclosure.

FIGS. 14 and 15 are schematic diagrams illustrating a modification when a voltage is applied to the piezoelectric device 10*b* according to the second aspect of the present disclosure. As illustrated in FIG. 5, polarization directions of piezoelectric layers 102 and 104 may be the same directions, and voltages applied to the piezoelectric layers 102 and 104 may be applied in opposite directions. Accordingly, a stretching direction (or an expansion and contraction direction) of the piezoelectric layer 102 and the piezoelectric layer 104 may be opposite or inverted (or reversed) to each other.

As illustrated in FIG. 14, at a timing at which the piezoelectric layer 102 is deformed to contract in a horizontal direction (or a widthwise direction), the piezoelectric layer 104 may be deformed in a direction in which the piezoelectric layer 104 expands in the horizontal direction. Accordingly, an end portion of the piezoelectric device 10*b* may be bent in a direction closer to the vibration member 20. At this time, the vibration member 20 may be deformed based on a stress applied in a direction toward the piezoelectric device 10*a*.

As illustrated in FIG. 15, at a timing at which the piezoelectric layer 102 is deformed to expand in the horizontal direction, the piezoelectric layer 104 may be deformed in a direction in which the piezoelectric layer 104 contracts in the horizontal direction. Accordingly, an end portion of the piezoelectric device 10*b* may be bent in a direction spaced apart from or away from the vibration member 20. At this time, the vibration member 20 may be deformed based on a stress applied in a direction spaced apart from or away from the piezoelectric device 10*b*.

In the following description, a structure where an elastic member 30 is disposed at a near-center portion of the piezoelectric device 10*b* of FIG. 14 is compared with a structure where the elastic member 30 is disposed at both ends of the piezoelectric device 10*a* of FIG. 6. In this case, in FIGS. 6 and 14, displacements of the piezoelectric devices 10*a* and 10*b* may be the same in that an end portion is bent in a direction getting close to the vibration member 20. On the other hand, paying attention to the vibration member 20, the vibration member 20 of FIG. 6 may be deformed based on a stress applied in a direction distancing from the piezoelectric device 10*a*, but the vibration member 20 of FIG. 14 may be deformed based on a stress applied in a direction toward the piezoelectric device 10*b*. That is, a displacement of the piezoelectric device 10*a* of FIG. 6 and a displacement of the piezoelectric device 10*b* of FIG. 14 may have the same phase, but a displacement of the vibration member 20 of FIG. 6 and a displacement of the vibration member 20 of FIG. 14 may have opposite phases.

Moreover, comparing FIG. 7 with FIG. 15, a relationship between phases may be formed as described above. For example, a displacement of the piezoelectric device 10*a* of FIG. 7 and a displacement of the piezoelectric device 10*b* of FIG. 15 may have the same phase, but a displacement of the vibration member 20 of FIG. 7 and a displacement of the vibration member 20 of FIG. 15 may have opposite phases.

Figure 16:
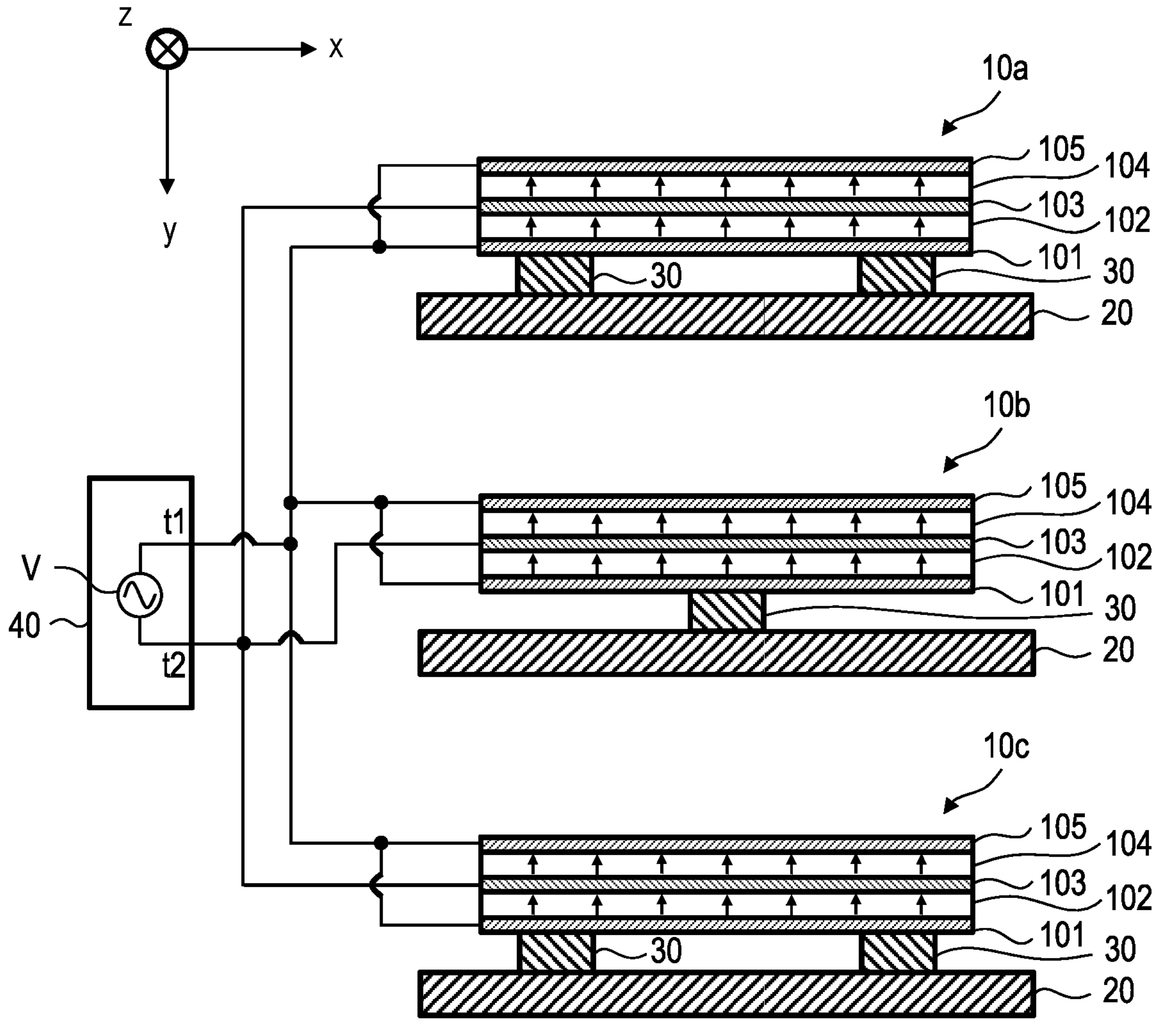
FIG. 16 is a schematic diagram illustrating in more detail a method of inputting a voice signal on each of piezoelectric devices according to a second aspect of the present disclosure.

FIG. 16 is a schematic diagram illustrating in more detail a method of inputting a voice signal on each of piezoelectric devices 10*a* to 10*c* according to a second aspect of the present disclosure. A controller 40 may output an AC voltage based on a voice signal to a terminal t1 (or a first terminal) and a terminal t2 (or a second terminal) of a signal source V. The terminal t1 may be connected to electrodes 101 and 105 of each of the piezoelectric devices 10*a* to 10*c*. The terminal t2 may be connected to an electrode 103 of each of the piezoelectric devices 10*a* to 10*c*.

Based on such a connection relationship, phases of voltages applied between electrodes of the piezoelectric devices 10*a* to 10*c* may be the same phases. As described above, a stress applied to the vibration member 20 by the piezoelectric devices 10*a* and 10*c* and a stress applied to the vibration member 20 by the piezoelectric device 10*b* may transfer vibrations having opposite phases to the vibration member 20.

As described above, a configuration of the sound apparatus 1 according to the second aspect of the present disclosure may differ from the first aspect of the present disclosure and phases of applied voltages may differ, but a phase relationship between vibrations provided to the vibration member 20 by the piezoelectric devices 10*a* to 10*c* according to the second aspect of the present disclosure may be the same as the first aspect of the present disclosure. Accordingly, the second aspect of the present disclosure may obtain the same effects as the first aspect of the present disclosure.

[Third Aspect]

In a third aspect of the present disclosure, a modification example of the sound apparatus 1 according to the first aspect of the present disclosure will be described. Repeated descriptions of elements common to the first aspect of the present disclosure are omitted or will be briefly given below.

Figure 17:
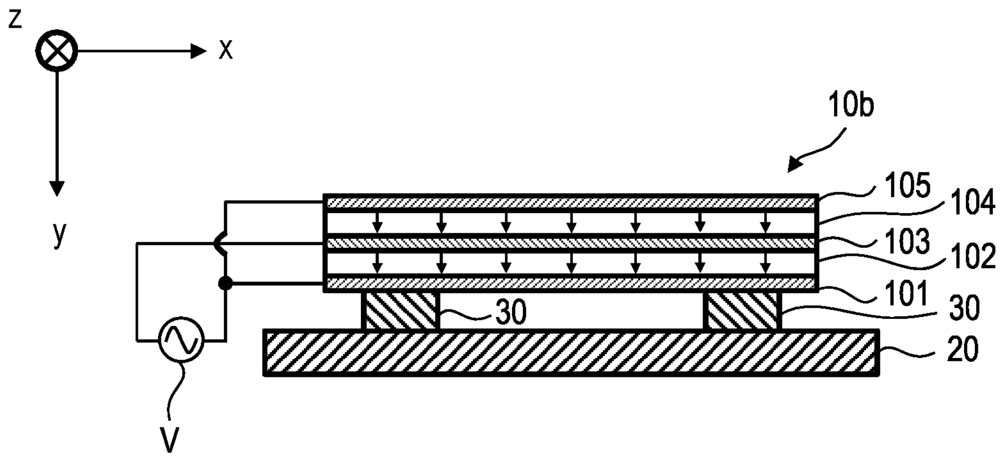
FIG. 17 is a cross-sectional view illustrating in more detail a structure of a piezoelectric device according to a third aspect of the present disclosure.

FIG. 17 is a cross-sectional view illustrating in more detail a structure of a piezoelectric device 10*b* according to a third aspect of the present disclosure. FIG. 17 illustrates a cross-sectional view taken along line A-A' of FIG. 2 like FIG. 6. Also, FIG. 17 illustrates an enlarged portion near the piezoelectric device 10*b*. Also, other piezoelectric devices 10*a* and 10*c* may have the same structure as FIG. 5 according to the first aspect of the present disclosure. Also, FIG. 17 schematically illustrates, by a circuit diagram, a connection relationship between electrodes included in the piezoelectric device 10*b*, for describing a method of inputting a voice signal on the piezoelectric device 10*b*. Arrows illustrated inside piezoelectric layers 102 and 104 represent polarization directions of the piezoelectric layers 102 and 104. In the first aspect of the present disclosure, the polarization directions of the piezoelectric devices 10*a* and 10*c* illustrated in FIG. 5 may be an upward direction (a negative direction of a y axis), but a polarization direction of the piezoelectric device 10*b* illustrated in FIG. 17 may be a downward direction (a positive direction of the y axis). For example, a polarization direction of the piezoelectric device 10*b* may be opposite to polarization directions of the piezoelectric devices 10*a* and 10*c*. In FIG. 17, in addition to the polarization direction of the piezoelectric device 10*b*, a structure and a voltage applying direction may be the same as the illustration of FIG. 5, and thus, their repetitive descriptions are omitted.

Figure 18:
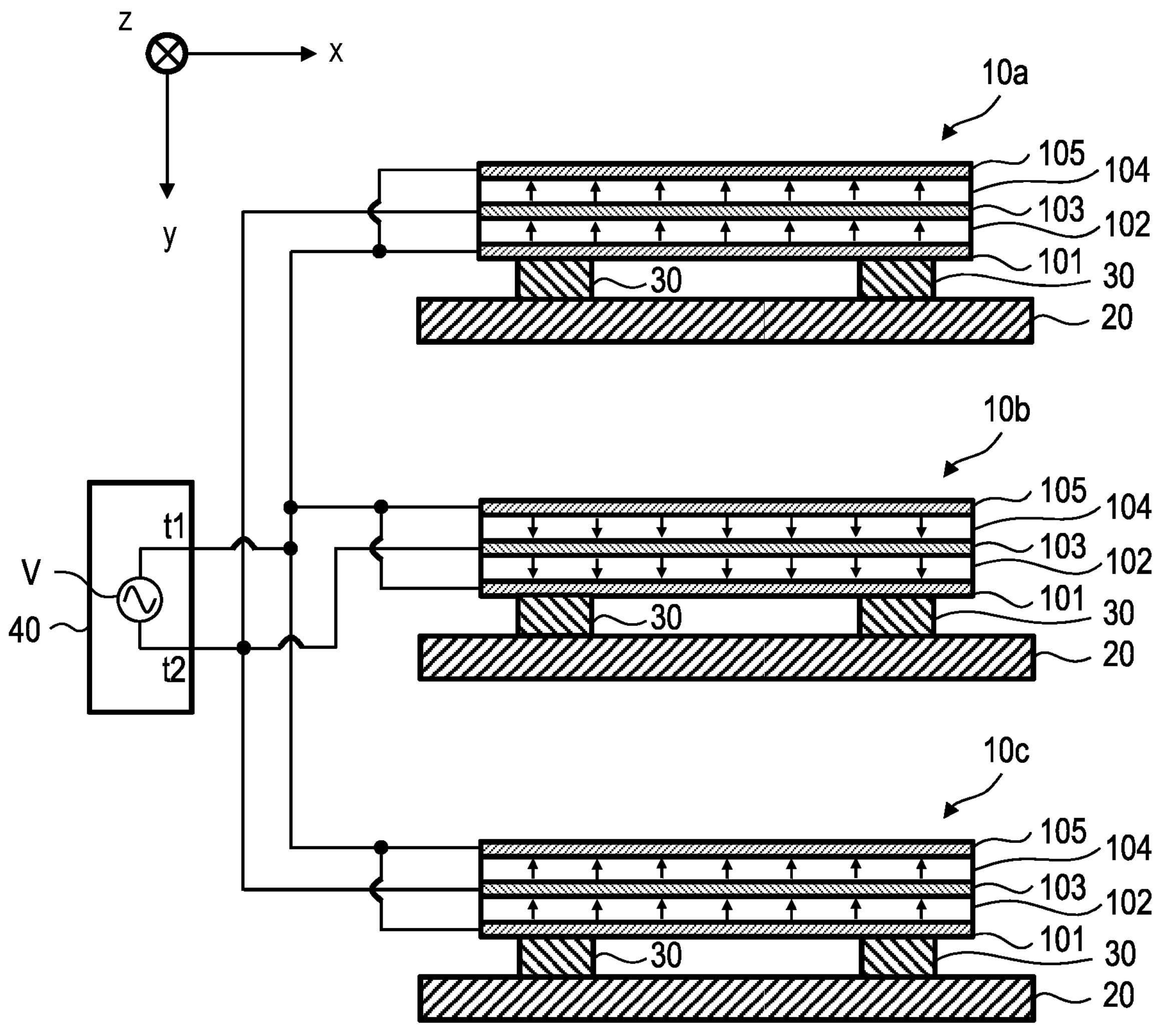
FIG. 18 is a schematic diagram illustrating in more detail a method of inputting a voice signal on each of piezoelectric devices according to a third aspect of the present disclosure and FIG. 19 is a schematic block diagram of a display apparatus according to a fourth aspect of the present disclosure.

FIG. 18 is a schematic diagram illustrating in more detail a method of inputting a voice signal on each of piezoelectric devices 10*a* to 10*c* according to a third aspect of the present disclosure. A controller 40 may output an AC voltage based on a voice signal to a terminal t1 (or a first terminal) and a terminal t2 (or a second terminal) of a signal source V. The terminal t1 may be connected to electrodes 101 and 105 of each of the piezoelectric devices 10*a* to 10*c*. The terminal t2 may be connected to an electrode 103 of each of the piezoelectric devices 10*a* to 10*c*.

Based on such a connection relationship, phases of voltages applied between electrodes of the piezoelectric devices 10*a* to 10*c* may be the same phases. A direction of a displacement occurring in a piezoelectric device may be determined based on a voltage applying direction and a polarization direction. In two piezoelectric devices having the same structure, when a voltage applying direction is the same and polarization directions of the piezoelectric devices are opposite, directions of forces generated by voltages may be opposite (or reverse directions), and thus, directions of displacements occurring in the piezoelectric devices may be opposite directions (or reverse directions). Accordingly, in a configuration of FIG. 18, a stress applied to a vibration member 20 by the piezoelectric devices 10*a* and 10*c* and a stress applied to the vibration member 20 by the piezoelectric device 10*b* may have opposite phases. For example, a stress applied to the vibration member 20 by the piezoelectric devices 10*a* and 10*c* and a stress applied to the vibration member 20 by the piezoelectric device 10*b* may transfer vibrations having opposite phases to the vibration member 20.

As described above, a configuration of the sound apparatus 1 according to the third aspect of the present disclosure may differ from the first aspect of the present disclosure and phases of applied voltages may differ, but a phase relationship between vibrations provided to the vibration member 20 by the piezoelectric devices 10*a* to 10*c* according to the third aspect of the present disclosure may be the same as the first aspect of the present disclosure. Accordingly, the third aspect of the present disclosure may obtain the same effects as the first aspect of the present disclosure.

[Fourth Aspect]

In a fourth aspect of the present disclosure, an aspect where the sound apparatus 1 according to the first to third aspects of the present disclosure performs a display panel function of a display apparatus will be described in detail. Repeated descriptions of elements common to the first to third aspects of the present disclosure are omitted or will be briefly given below.

Figure 19:
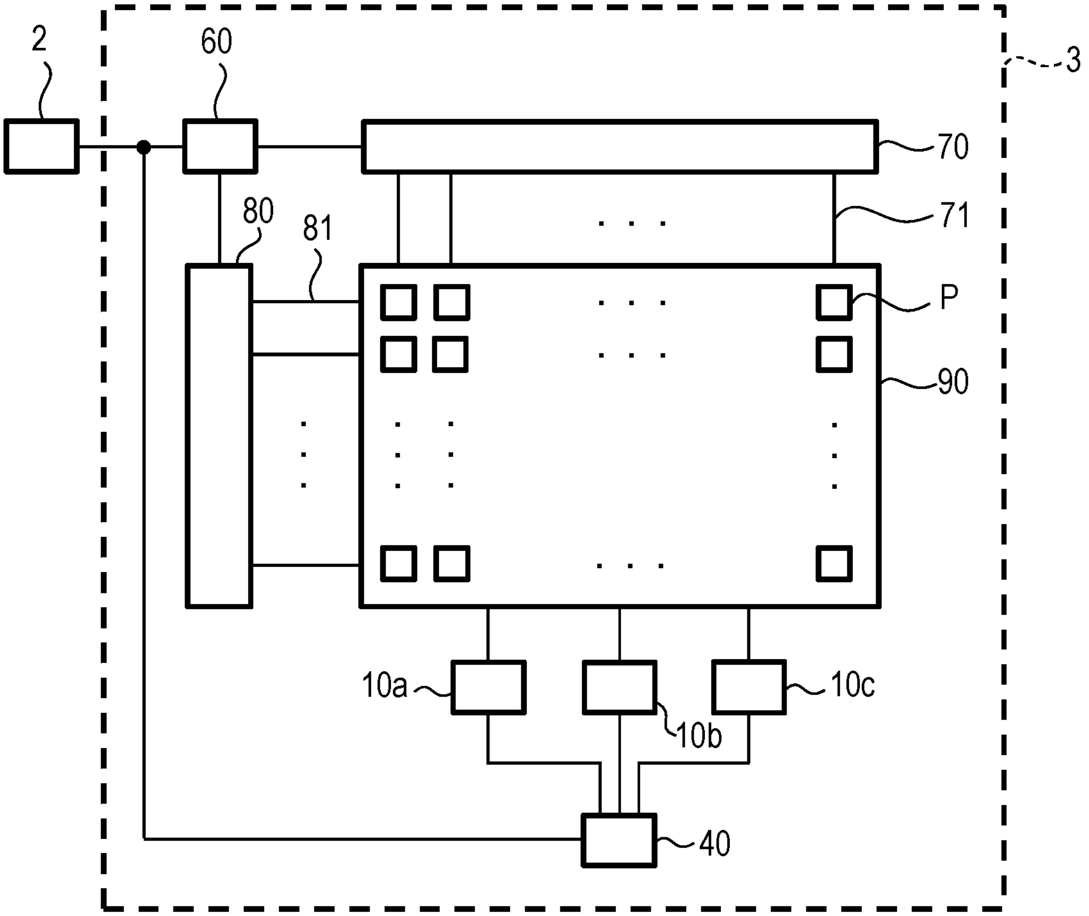

FIG. 19 is a schematic block diagram of a display apparatus 3 according to a fourth aspect of the present disclosure. The use purpose of the display apparatus 3 according to a fourth aspect of the present disclosure may be applied to, for example, electronic posters, digital bulletin boards, electronic advertisement signboards, computer displays, televisions, smart phones, or game machines, or the like, but aspects of the present disclosure are not limited thereto. A configuration of each of a host system 2, piezoelectric devices 10*a* to 10*c*, and a controller 40 may be the same as one of the first to third aspects of the present disclosure, and thus, their repetitive descriptions may be omitted.

As illustrated in FIG. 19, the display apparatus 3 may include piezoelectric devices 10*a* to 10*c*, a controller 40, a panel controller 60, a data driving circuit 70, a gate driving circuit 80, and a display panel 90. The display apparatus 3 may be an apparatus which displays an image by a display panel 90 based on RGB data or the like input thereto and generates a sound or a vibration based on a sound signal (or a vibration driving signal) or the like input thereto. Thus, the display apparatus may be implemented as a sound apparatus. As illustrated in FIG. 19, in the display apparatus 3, a plurality of piezoelectric devices 10*a* to 10*c* may implement a vibration apparatus connected to a display panel 90 by an elastic member. For example, the piezoelectric devices 10*a* to 10*c* and the elastic member may be configured as a vibration apparatus that vibrates the display panel 90 which is a vibration member.

The panel controller 60 may control the data driving circuit 70 and the gate driving circuit 80 based on image data and a timing signal input from the host system 2. The data driving circuit 70 may supply data voltages or the like to a plurality of pixels P through a driving line 71 disposed in each column of the plurality of pixels P. The gate driving circuit 80 may supply a control signal to the plurality of pixels P through a driving line 81 disposed in each row of the plurality of pixels P. Also, each of the driving line 71 and the driving line 81 may be provided in a plurality lines.

The display panel 90 may include the plurality of pixels P arranged to configure a plurality of rows and a plurality of columns. For example, the display apparatus 3 may be an organic light emitting diode (OLED) display using the display panel 90 where an OLED is provided as a light emitting device, but aspects of the present disclosure are not limited thereto. For example, the display apparatus 3 may be a liquid crystal display (LCD) where a liquid crystal panel including a liquid crystal material and a polarizer, or the like is used as the display panel 90. Based on such a structure, the display panel 90 may be thinned, and thus, the structure may be suitable for thinning the display apparatus 3. When the display apparatus 3 is capable of displaying a color image, the pixel P may be a subpixel which displays one of a plurality of colors (for example, RGB) implementing a color image.

The controller 40, the panel controller 60, the data driving circuit 70, and the gate driving circuit 80 may be configured by one semiconductor IC or a plurality of semiconductor ICs. Also, some or all of the controller 40, the panel controller 60, the data driving circuit 70, and the gate driving circuit 80 may be integrally configured as one semiconductor IC (or one body or a single body).

The display apparatus 3 according to an aspect of the present disclosure may be supplied with an image signal (for example, RGB data), a voice signal (or a vibration driving signal), and a timing signal (including a vertical synchronization signal, a horizontal synchronization signal, and a data enable signal, etc.) from a host system 2, and thus, may display an image and simultaneously may generate a sound (or a vibration). The display panel 90 may include an image display surface for displaying an image and a rear surface (or a backside surface) which is opposite to the image display surface. The piezoelectric devices 10*a* to 10*c* may be connected to the rear surface of the display panel 90 through the elastic member 30. Therefore, the display panel 90 may include a function of displaying an image and a function of the vibration member 20. Accordingly, in the fourth aspect of the present disclosure, the display apparatus 3 having an acoustic effect where a sound is output from an image displayed by the display panel 90 may be provided.

[Other Aspect]

The above-described aspects are merely illustrative of several aspects to which the present disclosure may be applied, and the technical scope of the present disclosures should not be construed as being limited according to the above-described aspects. In addition, the present disclosure may be implemented in various aspects through appropriate modifications and variations without departing from the technical idea or scope of the disclosures. For example, it should be understood that an aspect in which some elements of one aspect are added to another aspect or an aspect in which some elements and substitutions of another aspect may be applied are also an aspect to which the present disclosure may be applied. Thus, it is intended that the present disclosure covers the modifications and variations of this disclosure provided they come within the scope of the appended claims and their equivalents. Hereinafter, a modification example capable of being applied to the above-described aspects will be described.

In the above-described aspects, the bimorph structure where two piezoelectric layers 102 and 104 are stacked has been described as an example of a structure of each of the piezoelectric devices 10*a* to 10*c*, but aspects of the present disclosure are not limited thereto. For example, the piezoelectric devices 10*a* to 10*c* may include a unimorph structure which includes one piezoelectric layer and a two-layer electrode disposed with the piezoelectric layer therebetween. In this case, a structure of a piezoelectric structure may be more simplified than the bimorph structure. Also, the piezoelectric devices 10*a* to 10*c* may include a multimorph structure which includes three or more piezoelectric layers and a four or more-layer electrode disposed with each of the piezoelectric layer therebetween. Comparing with the bimorph structure and the unimorph structure, in the multimorph structure, a displacement of the same application voltage may increase, and thus, a sound pressure level may be enhanced.

Moreover, the structure of each of the piezoelectric devices 10*a* to 10*c* may be a structure where unimorph, bimorph, or multimorph is stacked in plurality. In such a structure, displacements occurring in a plurality of elements may overlap, and thus, a sound pressure level may be enhanced.

In the above-described aspects, because a plane shape of each of the piezoelectric devices 10*a* to 10*c* enables a flexural displacement to easily occur, a rectangular shape where an aspect ratio differs is illustrated for example, but the present disclosure is not limited thereto. For example, a plane shape of each of the piezoelectric devices 10*a* to 10*c* may be a shape, having symmetricity, such as a circular shape or a polygonal shape. In this case, a distribution of a vibration may be easily uniformized two-dimensionally, and thus, an effect may be obtained where resonance is difficult to occur in the vibration member 20. Also, a plane shape of each of the piezoelectric devices 10*a* to 10*c* may be a regular polygonal shape where lengths of sides are uniform, or may be a figure including a curve. For example, a plane shape of each of the piezoelectric devices 10*a* to 10*c* may include an oval shape or a non-tetragonal shape.

Moreover, in the above-described aspects, an example where three piezoelectric devices 10*a* to 10*c* is illustrated, but aspects of the present disclosure are not limited thereto. For example, when it is possible to transfer vibrations having different phased to a vibration member, the number of piezoelectric devices 10*a* to 10*c* may be appropriately changed. For example, only two piezoelectric devices 10*a* and 10*b* may be installed, or four or more piezoelectric devices may be installed. When the number of piezoelectric devices is four or more, a piezoelectric device having the same configuration as the piezoelectric device 10*a* and a piezoelectric device having the same configuration as the piezoelectric device 10*b* may be alternately arranged, in order to effectively excite a corresponding-order natural vibration mode.

Moreover, in the above-described aspects, displacements between the piezoelectric devices 10*a* and 10*c* and the piezoelectric device 10*b* may be opposite phases, but it may not be necessary that a phase difference is an opposite phase (that is, a phase difference is 180 degrees) accurately. For example, a phase difference between the piezoelectric devices 10*a* and 10*c* and the piezoelectric device 10*b* may slightly deviate from 180 degrees or may be shifted by an arbitrary angle, and even in this case, sound quality may be enhanced.

Moreover, in the above-described aspects, the piezoelectric devices 10*a* to 10*c* are illustrated as an example of a vibration device which vibrates the vibration member 20, but if it is possible to transfer a vibration based on a voice vibration or a haptic vibration to the vibration member 20, a driving type of a vibration device is not limited to a piezoelectric type. A vibration device having another type such as a dynamic type or a static type may also be applied instead of the piezoelectric devices 10*a* to 10*c*. For example, a piezoelectric device may be thinned compared to a vibration device having another type, and thus, may be more suitable for a signage, a display apparatus, or an apparatus which needs to be thinned.

A sound apparatus and display apparatus comprising the same according to an aspect of the present disclosure will be described as follows.

A sound apparatus according to some aspects of the present disclosure may comprise a plurality of vibration devices, and a vibration member including a same main surface connected to the plurality of vibration devices, wherein the plurality of vibration devices may comprise a first vibration device and a second vibration device, and wherein the first vibration device and the second vibration device may transfer vibrations having different phases each other to the vibration member.

According to some aspects of the present disclosure, the first vibration device and the second vibration device may transfer vibrations having opposite phases each other to the vibration member.

According to some aspects of the present disclosure, a phase of a vibration driving signal input to the first vibration device may differ from a phase of a vibration driving signal input to the second vibration device.

According to some aspects of the present disclosure, a phase of a vibration driving signal input to the first vibration device may be opposite to a phase of a vibration driving signal input to the second vibration device.

According to some aspects of the present disclosure, each of the first vibration device and the second vibration device may comprise a first electrode and a second electrode, a signal source outputting the vibration driving signal may comprise a first terminal and a second terminal which output signals having opposite phases to each other, the first terminal may be connected to the first electrode of the first vibration device and the second electrode of the second vibration device, and the second terminal may be connected to the second electrode of the first vibration device and the first electrode of the second vibration device.

According to some aspects of the present disclosure, a position of a first connection part connected to the first vibration device and the vibration member on the first vibration device may differ from a position of a second connection part connected to the second vibration device and the vibration member on the second vibration device.

According to some aspects of the present disclosure, each of the plurality of vibration devices may be a plate having a rectangular shape, the first connection part may comprise a center of the plate, and the second connection part may comprise a position apart from the center of the plate in a long-side direction of the plate.

According to some aspects of the present disclosure, each of the plurality of vibration devices may be a piezoelectric device.

According to some aspects of the present disclosure, each of the plurality of vibration devices may be a piezoelectric device, and a polarization direction of a piezoelectric material included in the first vibration device may differ from a polarization direction of a piezoelectric material included in the second vibration device.

According to some aspects of the present disclosure, a phase of a vibration driving signal input to the first vibration device may be a same as a phase of a vibration driving signal input to the second vibration device.

According to some aspects of the present disclosure, the plurality of vibration devices may further comprise a third vibration device, and the first vibration device and the third vibration device may transfer vibrations having a same phase each other to the vibration member.

According to some aspects of the present disclosure, the second vibration device may be disposed between the first vibration device and the third vibration device.

According to some aspects of the present disclosure, the vibration member may be a plate having a rectangular shape, and the first vibration device, the second vibration device, and the third vibration device may be arranged in parallel in a long-side direction of the vibration member.

According to some aspects of the present disclosure, the sound apparatus may further comprise a connection member disposed between each of the plurality of vibration devices and the vibration member.

According to some aspects of the present disclosure, the connection member may be connected between both end portions or a central portion of each of the plurality of vibration devices and the vibration member.

According to some aspects of the present disclosure, the vibration member may be a display panel of a display apparatus, the vibration member may comprise an image display surface configured to display an image and a main surface opposite to the image display surface, and vibrations of the first vibration device and the second vibration device may be transferred to the main surface of the display panel.

According to some aspects of the present disclosure, the vibration member may comprise one or more of glass, resin, hard paper, compression paper, plastic, cloth, fiber, leather, metal, and wood.

According to some aspects of the present disclosure, the vibration member may be a signage, the vibration member may comprise a content arrangement surface, on which contents of the signage are arranged to be visible, and a main surface opposite to the content arrangement surface, and vibrations of the first vibration device and the second vibration device may be transferred to the main surface of the signage.

A display apparatus according to some aspects of the present disclosure may comprise a display panel including an image display surface configured to display an image and a main surface opposite to the image display surface; and a vibration apparatus configured to vibrate the display panel, the display panel may be a vibration member, and the vibration apparatus comprises the sound apparatus, the sound apparatus may comprise a plurality of vibration devices, and a vibration member including the same main surface connected to the plurality of vibration devices, wherein the plurality of vibration devices may comprise a first vibration device and a second vibration device, and wherein the first vibration device and the second vibration device may transfer vibrations having different phases each other to the vibration member.

According to some aspects of the present disclosure, the display panel may comprise an organic light emitting diode or a liquid crystal panel.

It will be apparent to those skilled in the art that various modifications and variations can be made in the present disclosure without departing from the technical or scope of the disclosures. Thus, it is intended that aspects of the present disclosure cover the modifications and variations of the disclosure provided they come within the scope of the appended claims and their equivalents.

What is claimed is:

1. A sound apparatus, comprising:

a first vibration device and a second vibration device; and a vibration member including a same main surface connected to the first and second vibration devices; and connection members disposed between each of the first and second vibration devices and the vibration member, wherein the first and second vibration devices transfer vibrations having different phases to the vibration member, wherein each of the first and second vibration devices comprises:

a first electrode, a second electrode, and a third electrode;

a first piezoelectric layer between the first electrode and the second electrode; and a second piezoelectric layer between the second electrode and the third electrode, wherein the first piezoelectric layer and the second piezoelectric layer are configured to deform in opposite directions, wherein the first and third electrodes are connected to a same signal terminal, and wherein the second electrode is connected to a signal terminal different from the first and third electrodes, wherein each of the first and second vibration devices has a rectangular shape, and wherein the connection members are connected between both end portions in a long-side direction of each of the first and second vibration devices and the vibration member.

2. The sound apparatus of claim 1, wherein the first vibration device and the second vibration device transfer vibrations having opposite phases to the vibration member.

3. The sound apparatus of claim 1, wherein a phase of a vibration driving signal input to the first vibration device differs from a phase of a vibration driving signal input to the second vibration device.

4. The sound apparatus of claim 1, wherein a phase of a vibration driving signal input to the first vibration device is opposite to a phase of a vibration driving signal input to the second vibration device.

5. The sound apparatus of claim 1, wherein a position of a first connection part connected to the first vibration device and the vibration member on the first vibration device differs from a position of a second connection part connected to the second vibration device and the vibration member on the second vibration device.

6. The sound apparatus of claim 5, wherein each of the plurality of vibration devices is a plate having a rectangular shape, the first connection part comprises a center of the plate, and the second connection part comprises a position apart from the center of the plate in a long-side direction of the plate.

7. The sound apparatus of claim 5, wherein a phase of a vibration driving signal input to the first vibration device is a same as a phase of a vibration driving signal input to the second vibration device.

8. The sound apparatus of claim 1, wherein each of the plurality of vibration devices is a piezoelectric device.

9. The sound apparatus of claim 1, wherein each of the first and second vibration devices is a piezoelectric device, and wherein a polarization direction of a piezoelectric material included in the first vibration device differs from a polarization direction of a piezoelectric material included in the second vibration device.

10. The sound apparatus of claim 1, further comprising a third vibration device, wherein the first vibration device and the third vibration device transfer vibrations having a same phase to the vibration member.

11. The sound apparatus of claim 10, wherein the second vibration device is disposed between the first vibration device and the third vibration device.

12. The sound apparatus of claim 11, wherein the vibration member has a plate having a rectangular shape, and wherein the first vibration device, the second vibration device, and the third vibration device are arranged in parallel in a long-side direction of the vibration member.

13. The sound apparatus of claim 1, wherein the vibration member is a display panel of a display apparatus, the vibration member comprises an image display surface configured to display an image and the main surface opposite to the image display surface, and vibrations of the first vibration device and the second vibration device are transferred to the main surface of the display panel.

14. The sound apparatus of claim 1, wherein the vibration member includes one or more of glass, resin, hard paper, compression paper, plastic, cloth, fiber, leather, metal, and wood.

15. The sound apparatus of claim 1, wherein the vibration member is a signage, the vibration member comprises a content arrangement surface, on which contents of the signage are arranged to be visible, and the main surface opposite to the content arrangement surface, and vibrations of the first vibration device and the second vibration device are transferred to the main surface of the signage.

16. A display apparatus, comprising:

a display panel including an image display surface configured to display an image and a main surface opposite to the image display surface;

a vibration apparatus configured to vibrate the display panel; and connection members disposed between the vibration apparatus and the display panel, wherein the display panel is a vibration member, wherein the vibration apparatus includes the sound apparatus including a first vibration device and a second vibration device, and a vibration member including a same main surface connected to the first and second vibration devices, and wherein the first and second vibration devices transfer vibrations having different phases to the vibration member, wherein each of the first and second vibration devices comprises:

a first electrode, a second electrode, and a third electrode;

a first piezoelectric layer between the first electrode and the second electrode; and a second piezoelectric layer between the second electrode and the third electrode, wherein the first piezoelectric layer and the second piezoelectric layer are configured to deform in opposite directions, wherein the first and third electrodes are connected to the same signal terminal, wherein the second electrode is connected to a signal terminal different from the first and third electrodes, wherein each of the first and second vibration devices has a rectangular shape, and wherein the connection members are connected between both end portions in a long-side direction of each of the first and second vibration devices and the vibration member.

17. The display apparatus of claim 16, wherein the display panel comprises an organic light emitting diode or a liquid crystal panel.

* * * * *